No. 896,201. PATENTED AUG. 18, 1908.
J. W. H. DOUBLER.
VOTING MACHINE.
APPLICATION FILED JAN. 21, 1905.

Witnesses
Inventor
John W. H. Doubler
By Edson Bros.
Attorneys

No. 896,201. PATENTED AUG. 18, 1908.
J. W. H. DOUBLER.
VOTING MACHINE.
APPLICATION FILED JAN. 21, 1905.

Witnesses

Inventor
John W. H. Doubler
By Edson Bro's.
Attorneys

No. 896,201. PATENTED AUG. 18, 1908.
J. W. H. DOUBLER.
VOTING MACHINE.
APPLICATION FILED JAN. 21, 1905.

Witnesses

Inventor
John W. H. Doubler
By Edson Bro's
Attorneys

UNITED STATES PATENT OFFICE.

JOHN W. H. DOUBLER, OF MILTON, PENNSYLVANIA, ASSIGNOR OF ONE-HALF TO JOHN M. HAYES, OF MONTOURSVILLE, PENNSYLVANIA.

VOTING-MACHINE.

No. 896,201.　　　　Specification of Letters Patent.　　　Patented Aug. 18, 1908.

Application filed January 21, 1905. Serial No. 242,126.

*To all whom it may concern:*

Be it known that I, JOHN W. H. DOUBLER, a citizen of the United States, residing at Milton, in the county of Northumberland and State of Pennsylvania, have invented certain new and useful Improvements in Voting-Machines; and I do hereby declare the following to be a full, clear, and exact description of the invention, such as will enable others skilled in the art to which it appertains to make and use the same.

My invention relates to improvements in voting machines.

The objects in view are to provide a voting machine, a door or barrier therefor and connecting mechanism between them whereby the actuation of said barrier will register the votes of the voter; to provide means permitting a voter to change or alter his original vote as many times as he desires before leaving the machine; to provide means for locking all of the counting or registering mechanisms which are set aside for registering the votes cast for different nominees for the same office when one vote for said office is cast; to prevent a voter from casting ballots for two or more nominees on different tickets for the same office; to provide means whereby the registering mechanisms relating to an entire ticket may be operated simultaneously; to provide means whereby after voting for one or more nominees of one or more tickets, a voter can simultaneously vote for the nominees of another party for the remaining offices; to prevent the actuation of the registering devices for the nominees to offices on the voter's party ticket for which other nominees of other tickets have been voted, when the straight ticket shaft of the party ticket is operated; and to provide means whereby when there are to be several candidates elected for the same office, only the number of votes equal to the number of officers to be elected to said office irrespective of the party to which each belongs, can be voted when that part of the machine becomes locked.

Other objects and advantages of my invention will appear in the following description, and the novel features thereof will be particularly pointed out in the appended claims.

In the accompanying drawings, illustrating the preferred embodiment of my invention: Fig. 13 is a detail view of one of the wedge members.

Referring more particularly to the drawings, 1 represents the face of the machine through which project the push buttons 2 of the voting shafts 3. Each voting shaft carries a wedge-shaped member 4 shown particularly in Fig. 13. Said wedge-shaped members are adapted to be pushed in between slidably mounted blocks 5 having dove-tail connections as at 6, with the supporting bar 7. For multicandidate voting, that is where a plurality of officers are to be elected for the same office, for which provision is made on the three lowest horizontal rows of voting shafts, a set of slidable blocks is arranged opposite the middle horizontal group of voting shafts and the upper and lower shafts are provided with brackets 8 reaching downward and upward, respectively, to which are secured the wedge-shaped pieces 4 adapted to enter between the blocks on said common slidable block support.

At the outer end of each voting shaft is pivoted a hook-plate 9 having a hook 10 adapted to normally engage a projection 11 on one of the vertical straight-ticket shafts 12. Each hook is also provided with a rounded shoulder 13 on the other side of the notch 10$^a$ and adapted to engage said projection on the vertical straight-ticket shaft when its voting shaft is pressed to disengage said notch of said hook from said projection. Said hook has a longitudinal slot 14 arranged over one of a series of pins 15 on a transverse rod 16, one of which is provided for each row of voting shafts, the hook on each voting shaft fitting over one of said pins of one of the transverse rods. Each of said rods 16 is normally held in position to retain the notches of the hooks in engagement with the projections on the vertical straight-ticket shafts by a spring 17.

Figure 1:
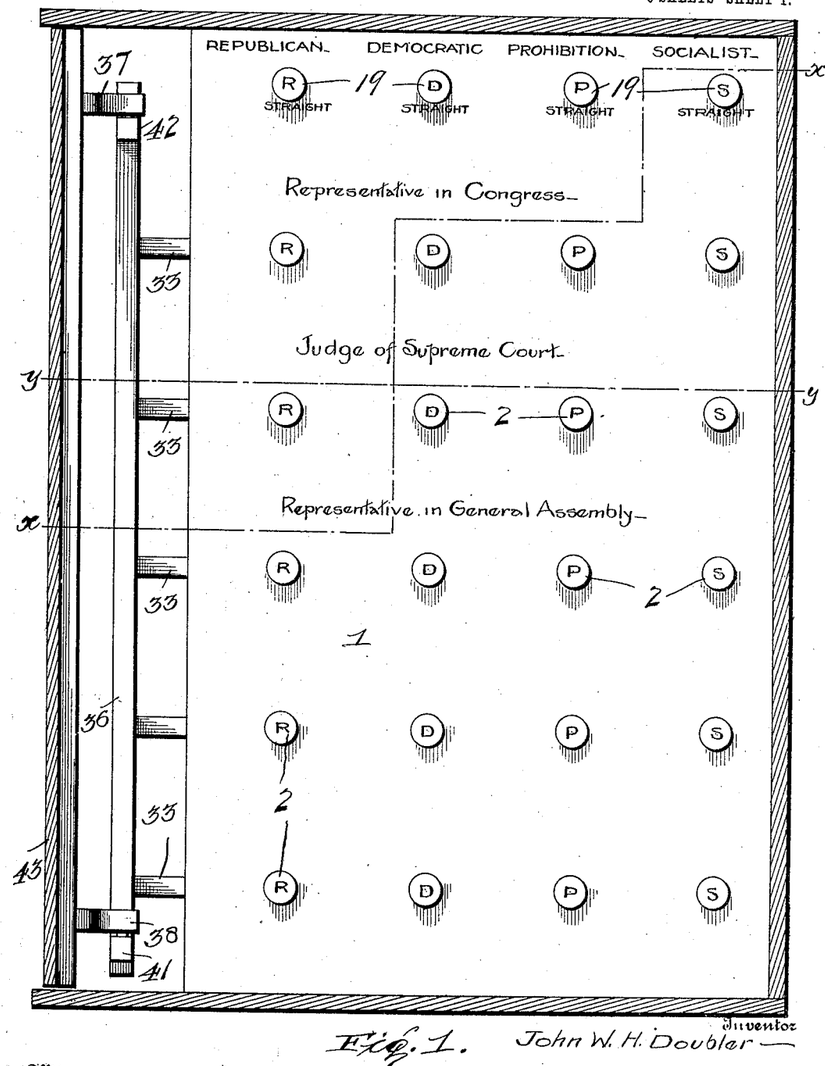
Figure 1 is a front elevation of a machine constructed in accordance with my invention.
Figure 2:
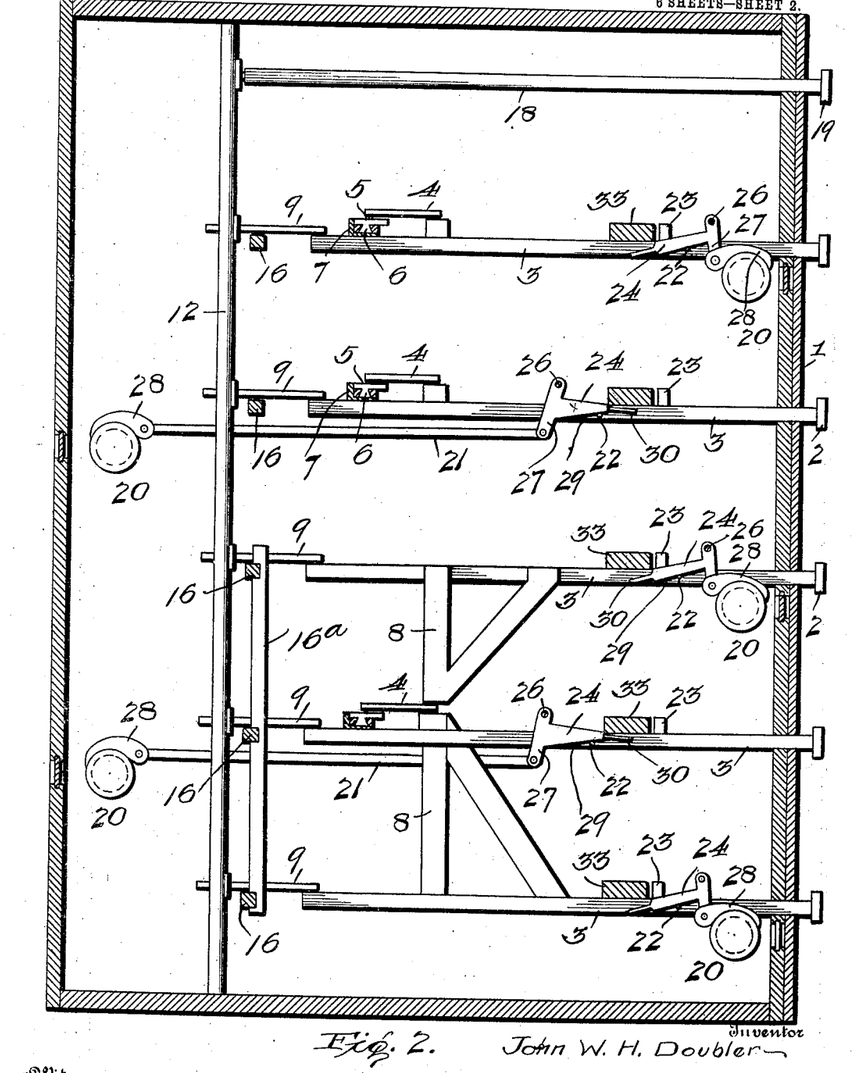
Fig. 2 is a vertical sectional view taken from front to back of the machine.
Figure 3:
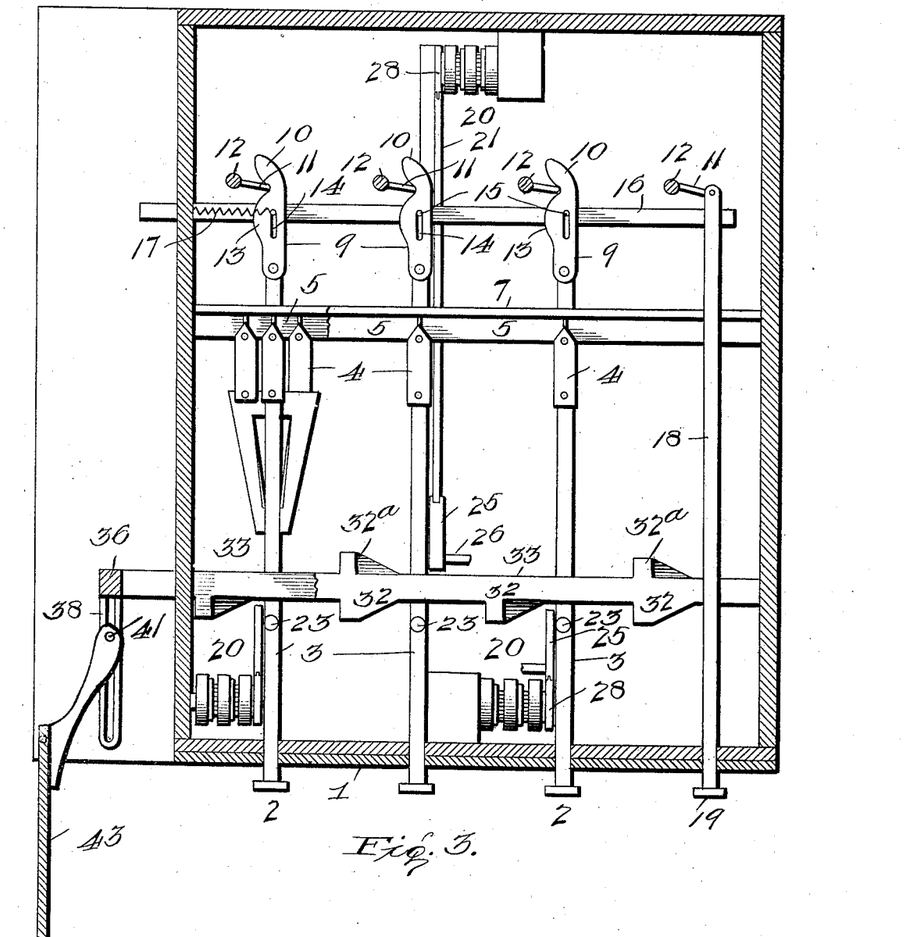
Fig. 3 is a horizontal cross-sectional view taken on the line $x$—$x$ of Fig. 1.
Figure 4:
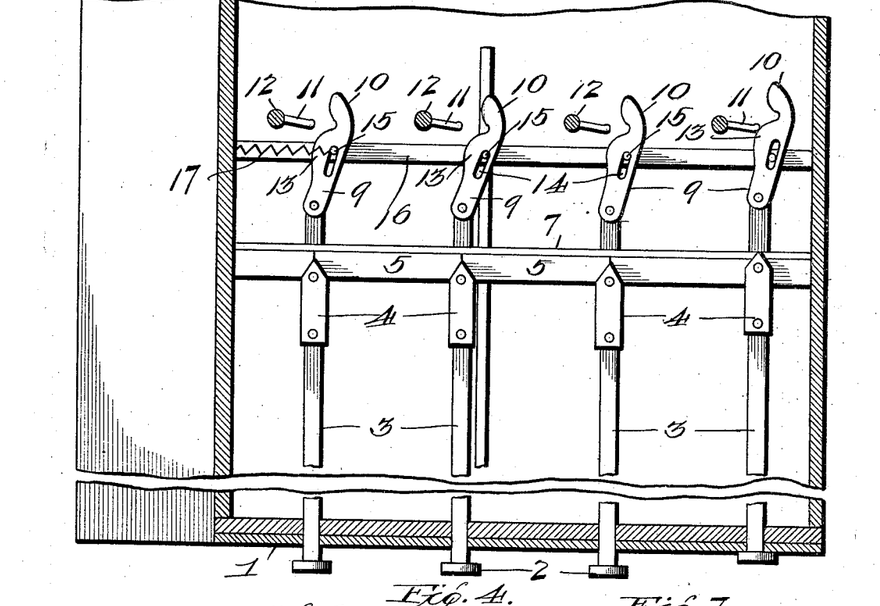
Fig. 4 is a horizontal sectional view taken on the line $y$—$y$ of Fig. 1 and showing one voting shaft pushed in and all the other voting shafts for that office locked and disconnected from their respective straight-ticket shafts.
Figures 5, 10:
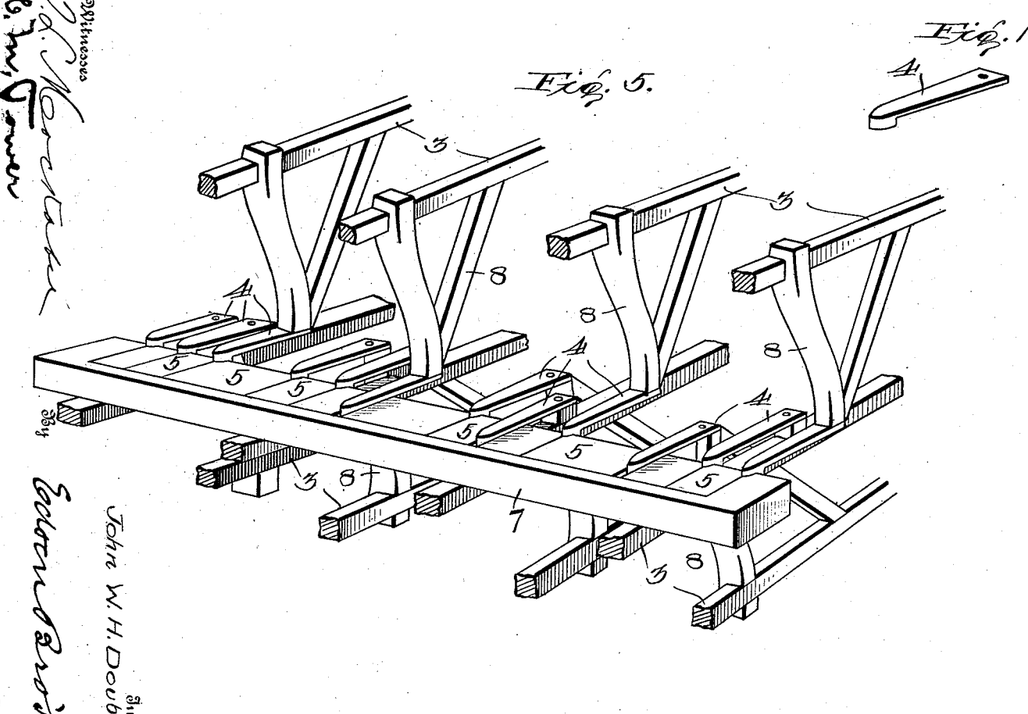
Fig. 5 is a broken perspective view looking in from the back of the lower part of the machine where it is arranged for voting for three nominees to the same office, showing three voting shafts in this group pushed in, the lowest one of the first ticket, the middle one of the second ticket, and the highest one of the third ticket, and all the other shafts locked, the rear ends of said shafts broken away.
Fig. 10 is a broken perspective view of the register actuating frame with its slides showing also the connections with the door or barrier.
Figure 6:
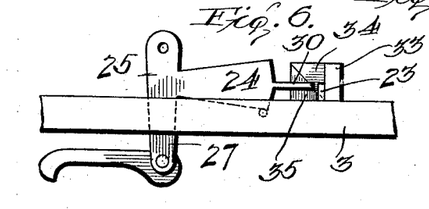
Figs. 6 and 7 are broken detail views showing the positions of the register actuating device used for operation of each of the registers located at the front of the machine, after the voting shaft has been pushed in and before and after the register actuating slide has been operated, respectively.
Figure 7:
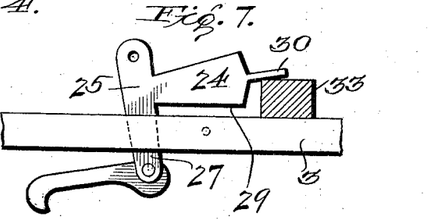
Figure 8:
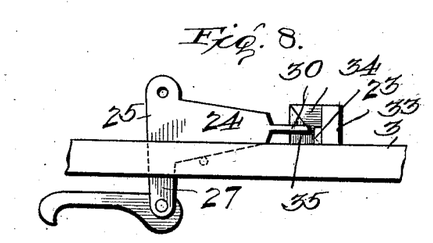
Figs. 8 and 9 are similar views of the register actuating device for operating each of the registers located at the back of the machine.
Figure 9:
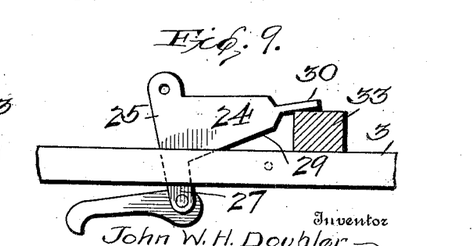
Figures 10, 11, 12:
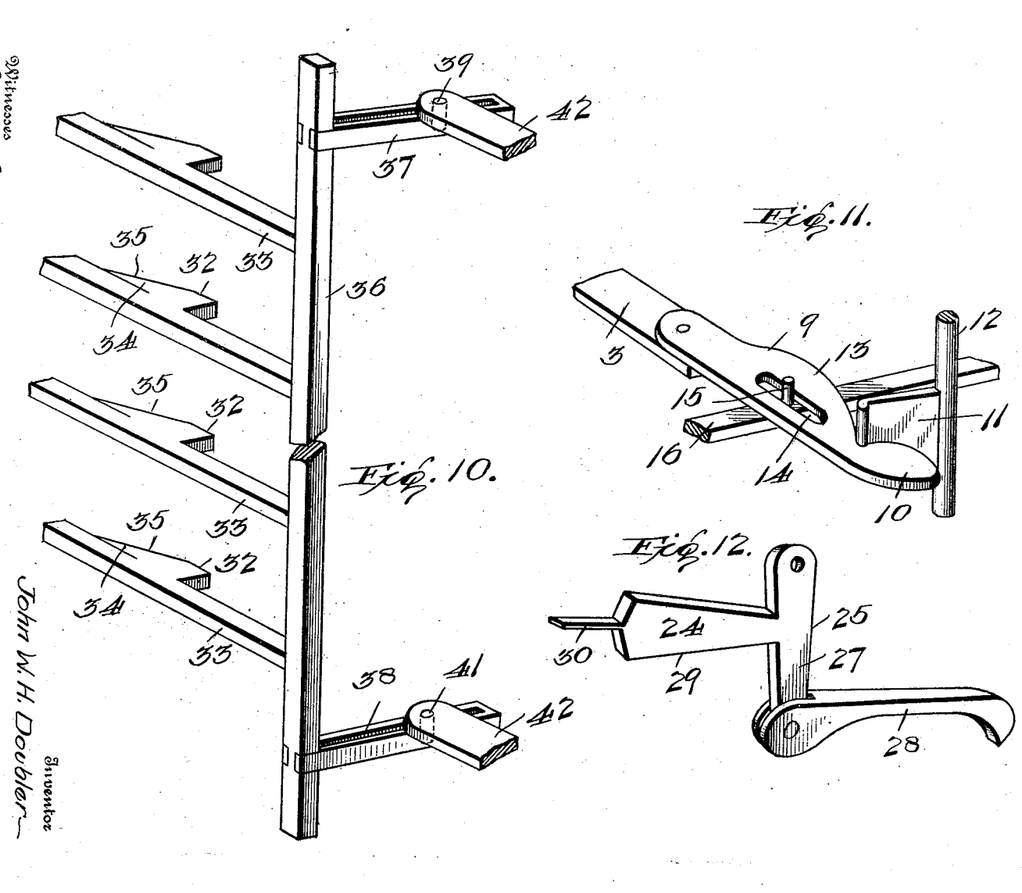
Fig. 11 is a broken detail perspective view showing the means of engagement between one of the voting shafts and a straight-ticket shaft.
Fig. 12 is a detail view of one of the register operating devices.

As shown more clearly in Fig. 4, when one of the voting shafts in a horizontal series is pushed in, the notch of its hooked-plate is thrown out of engagement with the projection on its vertical straight-ticket shaft by its shoulder, 13, riding upon said projection, and this causes the transverse rod to move longitudinally against the influence of the spring 17, because of the pin and slot connection of said hooked-plate with said rod. This longitudinal movement of the transverse rod throws all the hooks of the other voting shafts in the same horizontal row, out of engagement with the projections 11 of their respective vertical straight-ticket shafts because of their pin and slot connections with said bar. The three lower rows, 16, as shown in Fig. 2 are connected together by a bar 16$^a$ so that where three candidates are to be elected to one office, the pushing of any voting shaft in said row will unhook all the others in said first three rows from their respective vertical straight-ticket shafts. This provision is made because it often happens that the voter concludes that all the nominees of his party cannot be elected, but, on account of some peculiar weakness of the opposite or majority party, one of his party seems sure of election. Under such circumstances he would desire to vote only one vote for his party's strong candidate and all voting shafts for that particular party should then be disconnected from their vertical straight-ticket shafts. Connected to the upper end of each of the vertical straight-ticket shafts is a horizontal shaft 18 running to the face of the machine where it is provided with a push button 19 similar to those of the other voting shafts. The horizontal shafts 18 and the buttons 19 are called the horizontal straight-ticket shafts and straight-ticket buttons, respectively. When one of the straight-ticket buttons is pushed, it revolves its vertical shaft and causes all of the registers for the nominees for each office of that party, with the exception of those hooks which have been disengaged by voting for candidates separately, to be set ready to be actuated by the opening of the door by the voter as he leaves the machine. By this means a voter may readily cut his party ticket by voting for another party's nominee for one or more offices and afterwards vote for the remaining candidates of his own party by pushing its straight-ticket button.

Registers 20 of any desired construction are arranged preferably alternately at the front and back of the machine to economize vertical space. One register is provided for each voting shaft and each is adapted to be operated by mechanism presently described and which is set by a voting shaft. Each voting shaft is provided with two projecting pins, one pin 22 on the side thereof, and another, 23, on its upper edge. The pin 22 on each voting shaft supports the horizontall, extending arm 24 of a pivoted register actuating device 25 pivoted as at 26 to the framework of the machine and having a downwardly extending arm 27. The devices 25 are made in two styles, one for actuating the registers arranged at the front of the machine, in which case the downwardly extending arms, 27, carry the pawls, 28, for engagement with and operating the registers, the other for actuating the registers at the back of the casing, in which case the pawls, 28, are not directly connected to the downwardly extending arms of said device but are connected thereto by rods 21. In the first style, the horizontal arm, 24, extends rearward from the pivot 26, and the downwardly extending arm 27, while in the second style said horizontal arm extends forward from said pivot and downwardly extending arm.

The arm 24 of each register actuating device has an oblique lower edge 29 resting upon the pin 22 of its voting shaft, and the end of said arm is reduced as at 30 and normally, that is, before the voting shaft has been actuated, stands below the level of the small end 31 of a lug 32 or 32$^a$ on one of the register actuating slides 33, mounted to move horizontally across above said voting shaft. As each voting shaft is pushed in, its pin 22 rides along the oblique lower edge 29, of the horizontal arm 24, of the pivoted device 25, corresponding to said shaft and raises the reduced end 30 of said device enough to bring it above the plane of the small end 31 of one of the lugs 32 or 32$^a$, but not sufficiently to actuate its register. Said lugs 32 and 32ª, are arranged adjacent to the arms 24 of the register actuating devices 25 and have their upper and lateral edges beveled as at 34 and 35, respectively. When said register actuating slides 33, are pushed in the reduced ends 30 of the arms 23 are engaged by the upper beveled edges 34, of the lugs 32 and 32ª, whereby said arms are raised, the devices 25 turned on their pivots and the registers turned one point by means of the pawls 28 and the connecting rods 21. At the same time the lateral beveled edges 35 of the lugs 32 engage the pins 23 on the upper edges of the voting shafts and return them to their normal positions projecting from the front of the machine and ready to be again operated. All of the register actuating slides 33 are connected at their outer ends by a vertical rod 36 carrying slotted upper and lower members 37, 38, respectively, in which work pins 39, 40 on arms 41, 42, respectively, at the lower and upper ends of the barrier 44, whereby said actuating slides are simultaneously actuated by the movement of the door or barrier. It will be noted that when any of the voting shafts are not pushed in their register actuating devices 25 will not be operated to raise the parts 30 into the paths of the lugs 32 and 32ª of the register actuating slides, so that the registers of such voting shafts will not be actuated by said register actuating slides when a voter opens the barrier to leave the machine. It will also be noted that when a voting shaft has been pushed in and the part 30 of its register actuating device 25 has been raised into the path of the lugs 32, 32ª, said voting shaft may be withdrawn and said part 30 dropped again out of the path of said lugs, and that only those registers whose corresponding voting shafts have been left pushed in will be actuated by the opening of the barrier. Thus provision is made for a voter to change his vote as many times as desired before he leaves the machine. The lugs in the cases where the ends of the arms 24 of the register actuating devices have not been raised by leaving the voting shafts pushed in will pass over the ends of said arms and not actuate their registers.

The pin 23 on each voting shaft limits the inward movement of said shaft by coming in contact with its register actuating slide. When said register actuating slide is operated to register the votes of the depressed voting shafts, its lateral beveled edges 35 of the lugs 32 engage the pins 23 and return the voting shafts to their normal positions. It will be noted that the lugs 32ª for operating the registers arranged at the back of the machine are on the rear edge of the register actuating slides, while the other lugs 32 extend forward on the other side to engage the pins 23 to return the voting shafts. It will also be observed that as long as the barrier remains open the lugs 32 on the register actuating slides will be in engagement with the pins 23 on the voting shafts, thereby locking said voting shafts against operation. This feature of the device prevents any one from tampering with the machine while the barrier is open giving access to the general public.

Having thus described my invention, what I claim as new and desire to secure by Letters Patent, is:

1. In a machine of the character described, the combination with a series of voting devices, of means to separately set said devices ready for registering, straight ticket means to set all the voting devices for one ticket by one operation, connection between said voting devices and straight-ticket devices, means to disconnect a voting device for an office on one ticket from the "straight" voting mechanism when a voting device for a candidate for said office on another ticket has been set without preventing the actuation of the "straight" voting mechanism for the remaining party candidates, and means to subsequently register the votes indicated by the voting devices finally set.

2. In a machine of the character described, a series of voting devices, means to separately set said devices ready for registering, straight ticket means to set all the individual and multicandidate voting devices for one ticket at one operation, connection between said voting devices and straight-ticket devices, means to disconnect any one of said individual or multicandidate voting devices for an office on one ticket from the "straight" voting mechanism when a voting device for a candidate for said office on another ticket has been set without preventing the actuation of the "straight" voting mechansim for the remaining party candidates and means to register the votes indicated by the voting device finally set as the next voter approaches the machine.

3. In a machine of the character described, the combination with a series of voting devices, of means to separately set said devices ready for registering, straight ticket means to set all the voting devices for one ticket by one operation, connection between said voting devices and straight-ticket devices, means to lock all voting devices for other candidates for the same office when one of the voting devices for a candidate for said office is set without preventing the actuation of the "straight" voting mechanism for the remaining party candidates, means to disconnect a voting device for an office on one ticket from the "straight" voting mechanism when a voting device for a candidate for said office on another ticket has been set, and means to subsequently register the votes indicated by the voting devices finally set.

4. In a machine of the character described, a series of voting devices, means to separately set said devices ready for registering, straight ticket means to set all the voting devices for one ticket by one operation, connection between said voting devices and straight-ticket devices, means to lock all voting devices for other candidates for the same office when one of the voting devices for a candidate for said office is set, means to disconnect a voting device for an office on one ticket from the "straight" voting mechanism when a voting device for a candidate for said office on another ticket has been set without preventing the actuation of the "straight" voting mechanism for the remaining party candidates, and means to register the votes indicated by the voting device finally set as the next voter approaches the machine.

5. In a machine of the character described, the combination with a series of voting devices, each voting device carrying a wedge, a supporting ledge, of a series of slidably mounted blocks having dove-tail connection with said supporting ledge, the requisite number of wedges on said voting devices adapted to enter between said blocks and lock the other voting devices, and means to register the votes indicated by the voting devices finally set.

6. In a machine of the character described, the combination with a series of voting devices, each voting device carrying a wedge, a supporting ledge, of a series of slidably mounted blocks having dove-tail connection with said supporting ledge, the requisite number of wedges on said voting devices adapted to enter between said blocks and lock the other voting devices, means permitting the voter to return a voting device already set to its normal position and set another in its stead, and means to register the votes indicated by the voting devices finally set.

7. In a machine of the character described, the combination with a series of voting devices arranged in sets, each set having hook connection with a "straight" voting device, of means to separately set said voting devices ready for registering, means to disengage the hook of one voting device from its "straight" voting device when one voting device on another ticket for that office has been set, and means for registering the votes indicated by the voting devices finally set.

8. In a machine of the character described, the combination with a series of voting devices arranged in sets, each set having hook connection with a "straight" voting device, of means to separately set said voting devices ready for registering, means to disengage the hooks of all voting devices from their "straight" voting devices when one voting device on another ticket for that office has been set, means to lock all voting devices for other candidates for the same office when the requisite number of voting devices for candidates for said office are set, and means for registering the votes indicated by the voting devices finally set.

9. In a machine of the character described, the combination with a series of voting devices each having a longitudinally movable shaft, of hooks having slots therein attached to each shaft, a longitudinally movable rod mounted transversely of said voting shafts and having a series of pins, one engaging the slot in each of said hooks, a series of "straight" voting devices adapted to be normally engaged by said hooks, said hooks each having a rounded shoulder adapted to ride out on said "straight" voting device whereby said rod is moved longitudinally and the other hooks on said rod are disengaged from said "straight" voting devices, and means to normally hold said rod in position so that said hooks engage said "straight" voting devices.

10. In a machine of the character described, the combination with a series of voting devices each having a longitudinally movable shaft, of hooks having slots therein attached to each shaft, a longitudinally movable rod mounted transversely of said voting shafts and having a series of pins, one engaging the slot in each of said hooks, a series of "straight" voting devices adapted to be normally engaged by said hooks, said hooks each having a rounded shoulder adapted to ride out on said "straight" voting device, whereby said rod is moved longitudinally and the other hooks on said rod are disengaged from said "straight" voting devices, and a spring attached to said rod adapted to normally hold it in position so that said hooks engage said "straight" voting devices.

11. In a voting machine of the character described, the combination with a series of voting devices, each having a longitudinally movable shaft, of hooks attached to each shaft, a series of "straight" voting devices each having a vertical rotary shaft provided with lateral projections, means to normally hold said hooks in engagement with said projections, and means to disengage the hooks of all the other voting shafts for the same office from the projections on their respective "straight" voting shafts when any voting shaft for this office is pressed.

12. In a machine of the character described, the combination with a series of voting devices, each having a longitudinally movable shaft provided with a projecting pin, a register, a pivoted register-actuating device having an arm with an obliquely formed lower edge resting upon said pin, whereby the end of said arm may be raised by the actuation of said voting shaft to set the device ready to be registered and a register actuating slide having means to engage said arm and raise the same to actuate the register.

13. In a machine of the character described, the combination with a series of voting devices, each having a longitudinally movable shaft provided with a projecting pin, a register, a pivoted register-actuating device having an arm with an obliquely formed lower edge resting upon said pin, whereby the end of said arm may be raised by the actuation of said voting shaft to set the device ready to be registered and a register actuating slide having a beveled lug adapted to engage said arm and raise the same to actuate the register.

14. In a machine of the character described, the combination with a series of voting devices each having a longitudinally movable shaft provided with projecting pins on its upper and lateral edges, a register, a pivoted register-actuating device having an arm with an obliquely formed lower edge resting upon said pin whereby the end of said arm may be raised by the actuation of said voting shaft to set the device ready to be registered, and a register actuating slide having a beveled lug adapted to engage said arm and the pin on the upper edge of said voting shaft to actuate the register and return said voting shaft to its normal position.

15. In a machine of the character described, the combination with a series of voting devices, of a series of registers arranged alternately at the front and back of the machine, means for connecting said registers and voting devices, and means to actuate said registers.

16. In a machine of the character described, the combination with a series of voting devices, of means to separately set said devices ready for registering, means to set all the voting devices for one ticket by one operation, connection between said voting devices and straight-ticket devices, means to lock all voting devices for other candidates for the said office when the required number of voting devices for candidates for said office are set, means to disconnect a voting device for an office on one ticket from the "straight" voting mechanism when a voting device for a candidate for said office on another ticket has been set without preventing the actuation of the "straight" voting mechanism for the remaining party candidates, and means to subsequently register the votes indicated by the voting devices finally set.

17. In a machine of the character described, a voting device, a slide adapted to engage and return said voting device to its normal position, said slide having an arm provided with a slot therein, and a hinged barrier, provided with an arm equipped with a pin extending into the slot in the arm carried by said slide, whereby the swinging of the barrier will move said slide longitudinally and cause it to return the voting device to its normal position.

18. In a machine of the character described, a voting device, a register, mechanism whereby the actuation of said voting device will set the register ready to be operated, a longitudinally movable slide adapted to actuate the register when set, said slide having an arm provided with a slot therein, and a hinged barrier provided with an arm equipped with a pin extending into the slot in the arm carried by said slide, whereby the swinging of the barrier will register the vote.

19. In a machine of the character described, a voting device, a register, mechanism whereby the actuation of said voting device will set the register ready to be operated, a longitudinally movable slide adapted to actuate the register when set and to engage and return said voting device to its normal position, said slide having an arm and provided with a slot therein, and a hinged barrier provided with an arm equipped with a pin extending into the slot in the arm carried by said slide, whereby the swinging of the barrier will move said slide and cause it to register the vote and return the voting device to its normal position.

20. In a device of the character described, the combination, with the settable candidate keys and a corresponding number of candidate registers, and means to actuate the registers selected for operation, of straight-ticket mechanism settable for any party group to insure the operation of all the registers for all the unscratched candidates thereof and connections between said registers and candidate keys and between the latter and the straight-ticket mechanism for operating all the registers in the selected party group in a single operation as said keys are returned to their normal positions except those of such candidates as have been scratched by setting the key for another candidate for the same office.

21. In a machine of the character described, a series of voting devices each having a longitudinally movable shaft provided with a projecting pin, registers corresponding to said voting devices, means for connection between said voting devices and said registers to set ready to be registered those devices whose shafts are actuated, registering slides having beveled lugs adapted to engage said pins and return the voting shafts to their normal positions, means to completely actuate the registers as said voting shafts are returned to their normal positions, a barrier and means of connection between said barrier and registering slides whereby the latter are retained in position with their lugs engaging said pins thereby locking said voting devices from being operated whenever said barrier is opened.

22. In a machine of the character described, a series of voting devices each having a longitudinally movable shaft provided with a projecting pin, registers corresponding to said voting devices, means for connection between said voting devices and said registers to set ready to be registered those devices whose shafts are actuated, registering slides carrying lugs having their upper and lateral faces beveled, the lateral beveled faces of said lugs adapted to engage said pins and return the voting shafts to their normal positions, register actuating devices adapted to be engaged by the upper beveled faces of said lugs whereby the registers are completely actuated as said voting shafts are returned to their normal positions, a barrier and means of connection between said barrier and registering slides whereby the latter are retained in position with their lugs engaging said pins thereby locking said voting devices from being operated whenever said barrier is opened.

In testimony whereof, I affix my signature, in presence of two witnesses.

JOHN W. H. DOUBLER.

Witnesses:
 JAMES H. BARTLETT,
 MILTON S. PIDCOE.